United States Patent [19]

Gilman et al.

[11] Patent Number: 4,779,461
[45] Date of Patent: Oct. 25, 1988

[54] METHOD OF AND APPARATUS FOR MEASURING AND RECORDING THE DROP HEIGHT OF A CONTAINER IN TRANSIT

[75] Inventors: Kevin J. Gilman, Carmel; William I. Kipp, Monterey, both of Calif.

[73] Assignee: Lansmont Corporation, Pacific Grove, Calif.

[21] Appl. No.: 18,090

[22] Filed: Feb. 24, 1987

[51] Int. Cl.⁴ .................... G01L 7/08; G01L 9/06
[52] U.S. Cl. .................... 75/865.3; 73/384; 73/714; 73/721
[58] Field of Search ............ 73/384, 386, 387, 178 T, 73/179, 716, 721, 178 R, 178 H, 714, 432 R, 727

[56] References Cited

U.S. PATENT DOCUMENTS

| | | | |
|---|---|---|---|
| 3,101,069 | 8/1963 | Reich, Jr. et al. | 116/114 |
| 3,312,188 | 4/1967 | Lode et al. | 116/114 |
| 3,608,370 | 9/1971 | Vollenweider et al. | 73/141 R |
| 3,623,449 | 11/1971 | Knutson | 116/114 AH |
| 3,726,138 | 4/1973 | Kosakowski et al. | 73/179 |
| 3,797,308 | 3/1974 | Crane | 73/178 T |
| 3,829,640 | 8/1974 | Taylor | 73/387 |
| 3,967,493 | 7/1976 | Murphy, Jr. et al. | 73/71 |
| 4,023,562 | 5/1977 | Hynecek et al. | 128/2.05 E |
| 4,163,396 | 8/1979 | Waugh | 73/721 |
| 4,302,973 | 12/1981 | Yoshino et al. | 73/384 |
| 4,362,060 | 12/1982 | Okayama et al. | 73/708 |
| 4,507,962 | 5/1985 | Hitt et al. | 73/384 |
| 4,535,638 | 8/1985 | Eernisse et al. | 73/862.59 |
| 4,554,927 | 11/1985 | Fussell | 128/670 |
| 4,574,640 | 3/1986 | Krechmery | 73/731 |

Brochure R-S Two-Way Ride Recorder, Impact Register Company, Brochure Bump.
Recorder Type 2503, B&K Instruments, Inc., Impact-O-Graph.

Primary Examiner—Donald O. Woodiel
Attorney, Agent, or Firm—Jack M. Wiseman

[57] ABSTRACT

Apparatus for measuring the drop height of a container by detecting changes in altitude pressure resulting from the drop of the container. The apparatus includes transducers for measuring absolute temperature, atmospheric barometric pressure, and the differential pressure between the release elevation and the impact elevation.

25 Claims, 7 Drawing Sheets

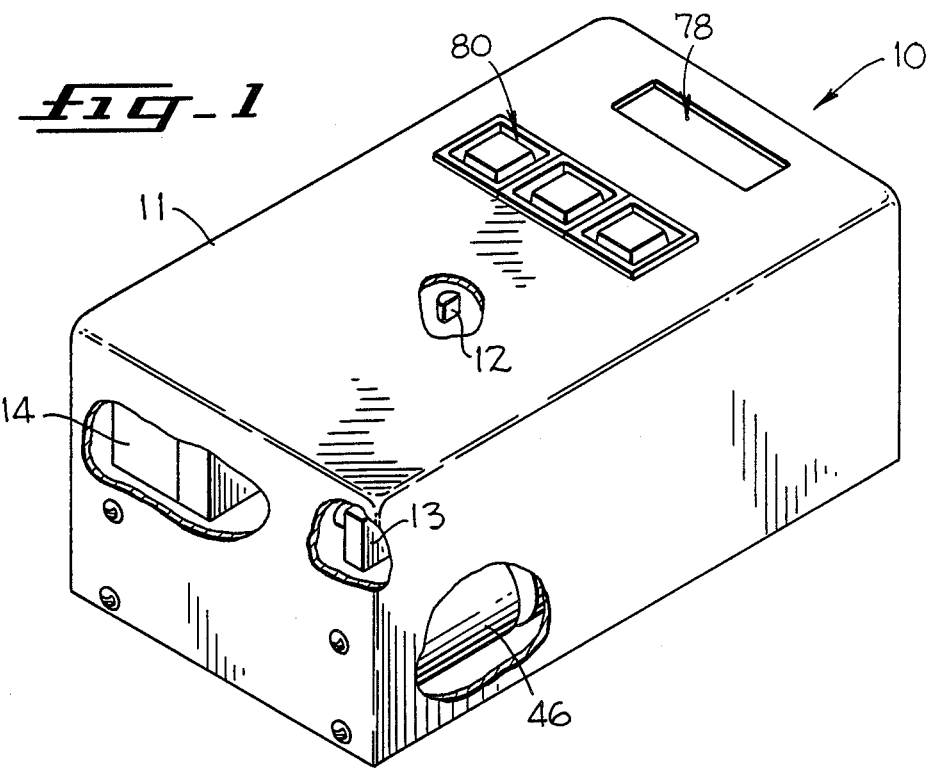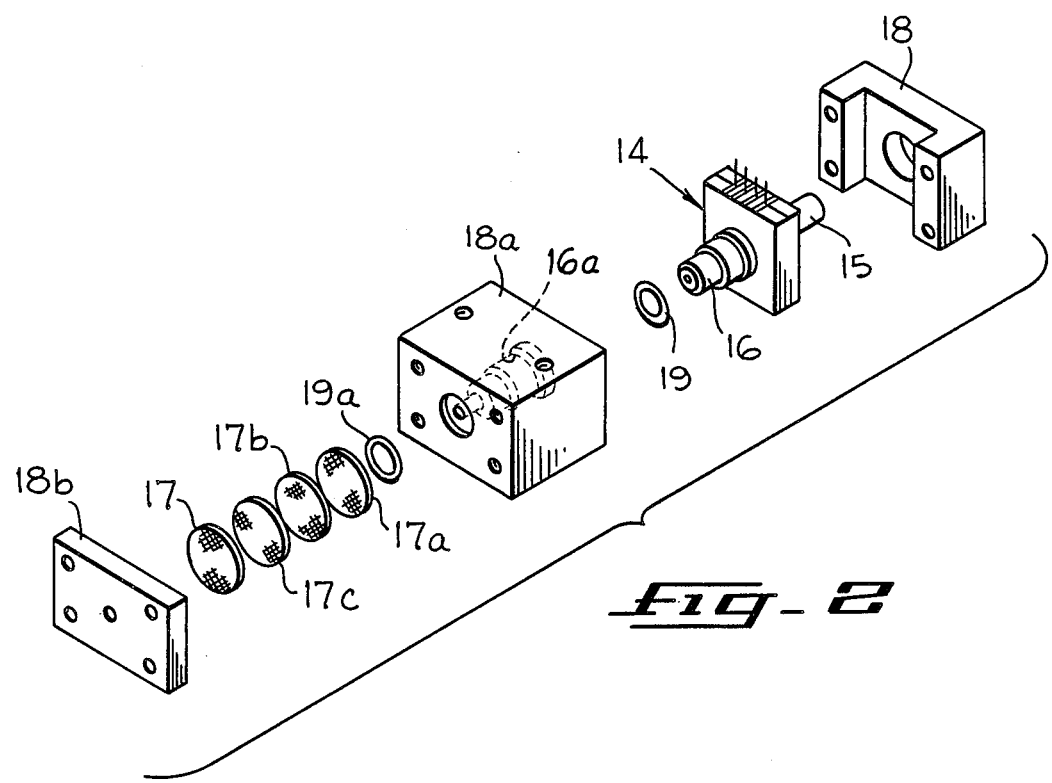

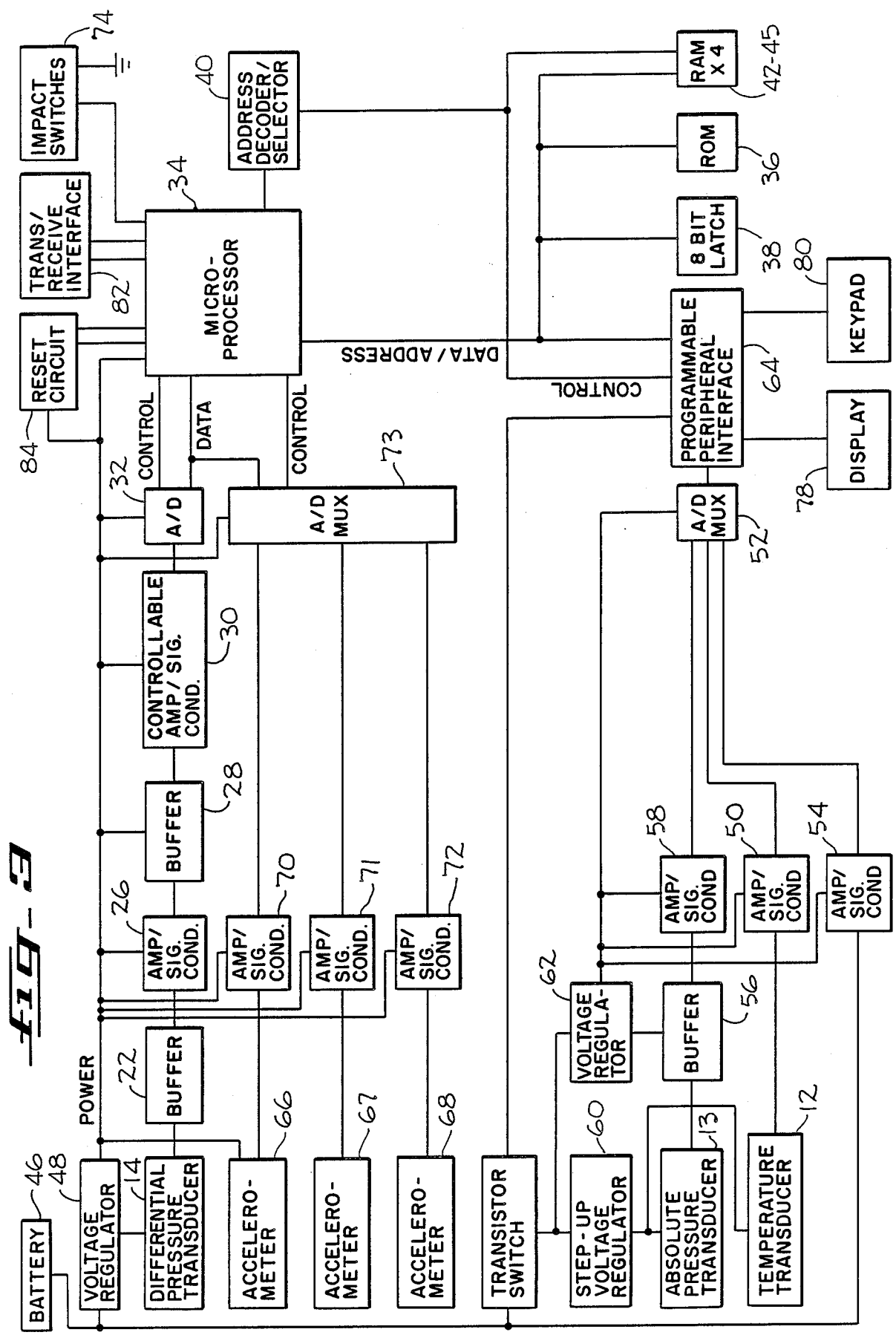

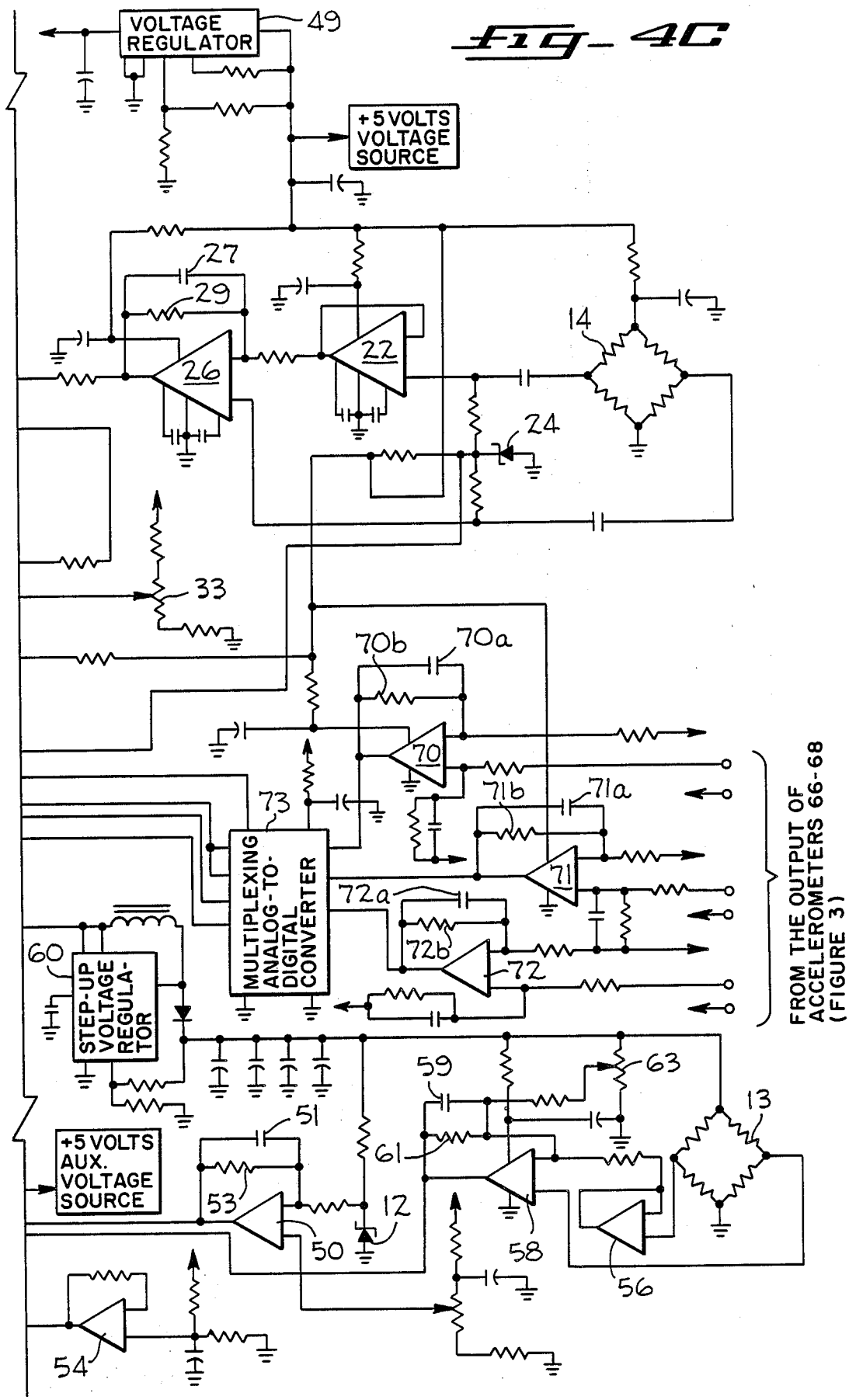

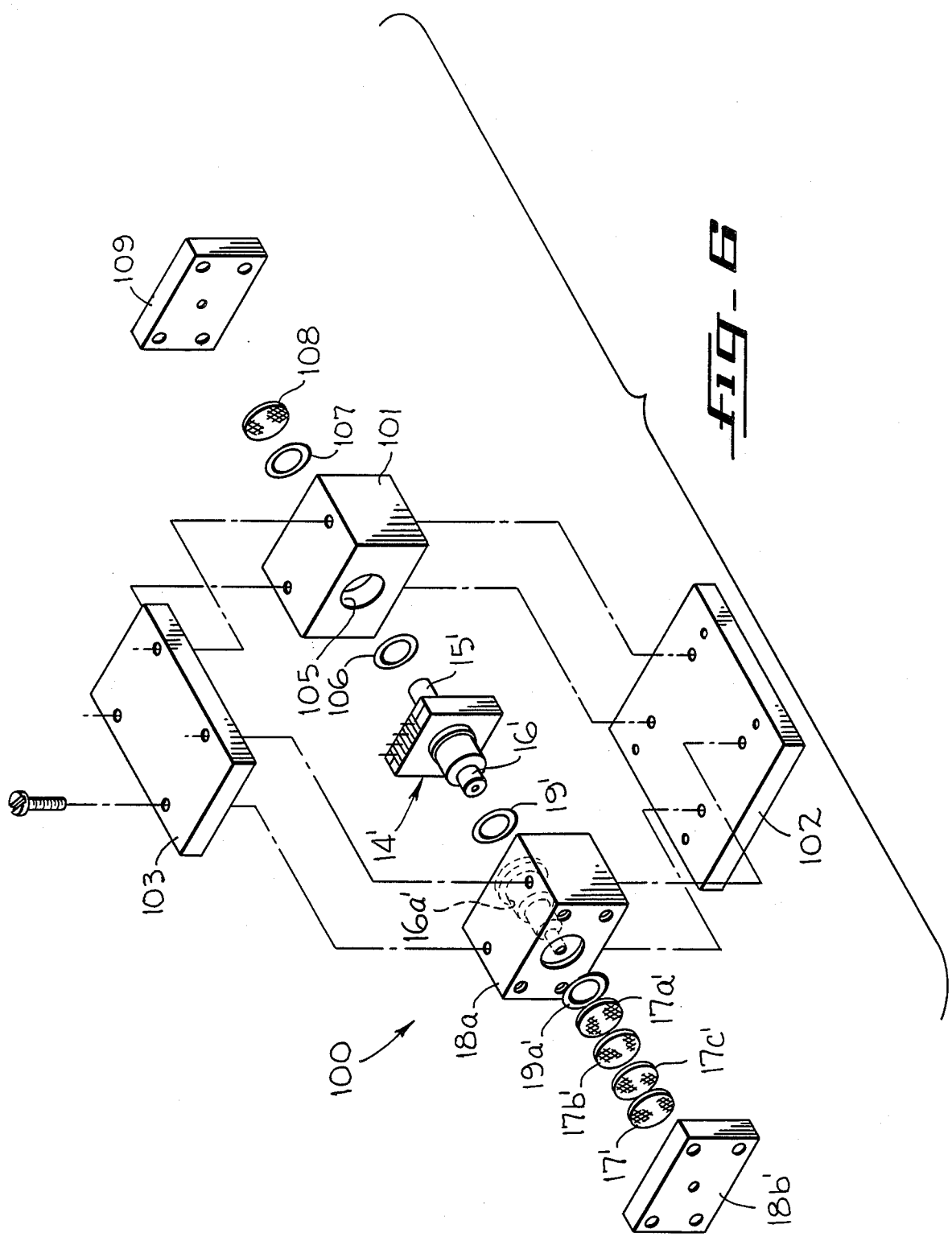

METHOD OF AND APPARATUS FOR MEASURING AND RECORDING THE DROP HEIGHT OF A CONTAINER IN TRANSIT

BACKGROUND OF THE INVENTION

The present invention relates in general to a method of and apparatus for measuring and recording the drop height of a container in transit, and more particularly to a method of and apparatus for measuring and recording the drop height of a container in transit by detecting pressure differentials resulting from dynamic elevational changes.

In the design of a protective package for a product, the magnitude of various hazards to which the packaged product may be subjected are determined. Shocks and impacts resulting from accidental free fall drops are hazards to which a package product is subjected. Therefore, it is desirable in the design of protective packages for goods to measure and record the free fall drop to which a packaged product may be subjected.

An R-S Two-Way Ride Recorder sold by Impact Register Company of Champaign, Ill., records simultaneously longitudinal and vertical impact on a chart. The vertical chart readings indicate the acceleration to which crating and merchandise are subjected when tested on vibration tables. The vertical acceleration is related to a mass suspended by a spring. An acceleration in mass in excess of a predetermined value dislodges the mass from a stop.

B & K Instruments, Inc. has sold a Bump Recorder, type 2503, which gives a digital reading of the level of mechanical shock to a package. The apparatus includes a triaxial acceleration sensitive device for monitoring impact in three mutually perpendicular directions. The shock or impact on a package is measured by the acceleration-tremor activity. The velocity level of a bump event is obtained by integrating the acceleration pulse which has exceeded a preset threshold.

Impact-0-Graph of Bedford, Ohio, has sold a Protect-0-Pak shock indicator for determining whether a device has been subjected to excess forces in transit. It is an accelerometer that is sensitive to forces applied from various directions. The apparatus comprises spring-loaded steel balls. The springs are calibrated to a preset value. A shock or impact in excess of the preset value triggers a measuring device.

The apparatus heretofore employed for measuring the impact or shock on packaged goods in transit indicate acceleration. Acceleration is dependent on various factors in addition to drop height, such as angle of impact, characteristic of the impacting surface and the cushioning material surrounding the measuring instrument. Mechanical devices of this type suffer from a lack of acceptable accuracy and from a dependence upon not only the amplitude, but also the duration of the impact shock pulse. Electronic apparatus of this type, while capable of reasonable accuracy in measuring acceleration, are not capable of operating over extended periods of time.

The Yoshino, et al. U.S. Pat. No. 4,302,973, issued on Dec. 1, 1981, for Altitude Difference Measuring Apparatus, discloses apparatus for detecting the difference in altitude between two places by measuring the barometric differential at the two places. At one place, ambient air is hermetically contained in an air pressure holding section. At the other place, the barometric difference between the air pressure in the air pressure holding section and the ambient air pressure is detected to produce electrical signals representative of the difference in altitude between the two places. A semicondutor pressure sensor produces the electrical signal corresponding to the difference between atmospheric pressure at the two places. The semiconductor pressure sensor hermetically seals the air pressure holding section and produces the electrical signal corresponding to the difference in pressures between the chamber of the air pressure holding section and the atmosphere at the location of the second place. A timing circuit controls the start and end of the measurements.

The Hitt, et al. U.S. Pat. No. 4,507,962, issued pn Apr. 2, 1985, for Digital Barometric Altimeter, discloses a digital altimeter for aircraft. The altimeter includes two pressure transducers. One pressure transducer is at the open end of a Pitot tube and the other transducer is at the open end of another tube. A temperature sensor is disposed adjacent each pressure transducer respectively. The two transducers are bridged together and are temperature compensated for balancing the output thereof for accurate pressure reading. A processor receives the balanced, compensated output of the transducers for displaying the altitude.

The Hynecek, et al. U.S. Pat. No. 4,023,562, issued on May 17, 1977, for miniature Pressure Transducer For Medical Use And Assembly Method, discloses a transducer for monitoring fluid pressure within a human body. Semiconductor strain gauge elements are formed on the surface of the silicon diaphragm area of a crystal silicon base. The strain gauge elements are contained in an evacuated fluid-tight chamber. Electrical conductors extend from the chamber to a remote display. The diaphragm is deformed by pressure differential between the sealed pressure reference chamber and fluid external to the implanted pressure chamber.

SUMMARY OF THE INVENTION

Apparatus for measuring the drop height of a container by detecting the changes in altitude pressure resulting from the drop of the container. Toward this end, the apparatus of the present invention includes three transducers for measuring the following:
 a. Absolute temperature;
 b. Barometric pressure; and
 c. Differential pressure between the release elevation and the impact elevation.

The drop height is calculated according to the following formula:

$$H = \frac{RT\,Pc}{g\,Pa},$$

wherein
 H = drop height
 T = absolute temperature
 g = gravitational constant
 Pc = pressure change
 Pa = barometric pressure
 R = gas constant for air.

An object of the present invention is to provide apparatus for measuring and recording the drop height of a container that is of acceptable accuracy.

Another object of the present invention is to provide apparatus for measuring and recording the drop height of a container that detects the change of altitude pressure resulting from the free fall drop of the container.
}

Another object of the present invention is to provide apparatus for measuring and recording the drop height of a container in situ for providing accurate data relating to the free fall drop of the container.

Another object of the present invention is to provide apparatus for measuring and recording the drop height of a container that is not dependent on the duration of the impact shock pulse.

A feature of the present invention is the measurement of the drop height resulting from transportation shocks and impacts without the influence of the angle of impact, characteristics of the impacting surfaces and the cushioning material surrounding the measuring instrument, which may be present in the measurement of acceleration.

DESCRIPTION OF THE DRAWINGS

FIG. 1 is a diagrammatic perspective view of the apparatus of the present invention for measuring and recording drop height broken away to illustrate the various transducers employed therein.

FIG. 2 is a diagrammatic exploded perspective view of a differential pressure transducer employed in the apparatus shown in FIG. 1.

FIG. 3 is a block diagram of the circuitry of the apparatus of the present invention for measuring and recording drop height.

FIGS. 4A–4C, when placed side-by-side, are a schematic diagram of the circuitry of the apparatus embodying the present invention for measuring and recording drop height.

FIG. 6 is a diagrammatic exploded perspective view of another embodiment of a differential pressure transducer employed in the apparatus shown on FIG. 1.

DETAILED DESCRIPTION OF THE PREFERRED EMBODIMENT

Figure 4A:
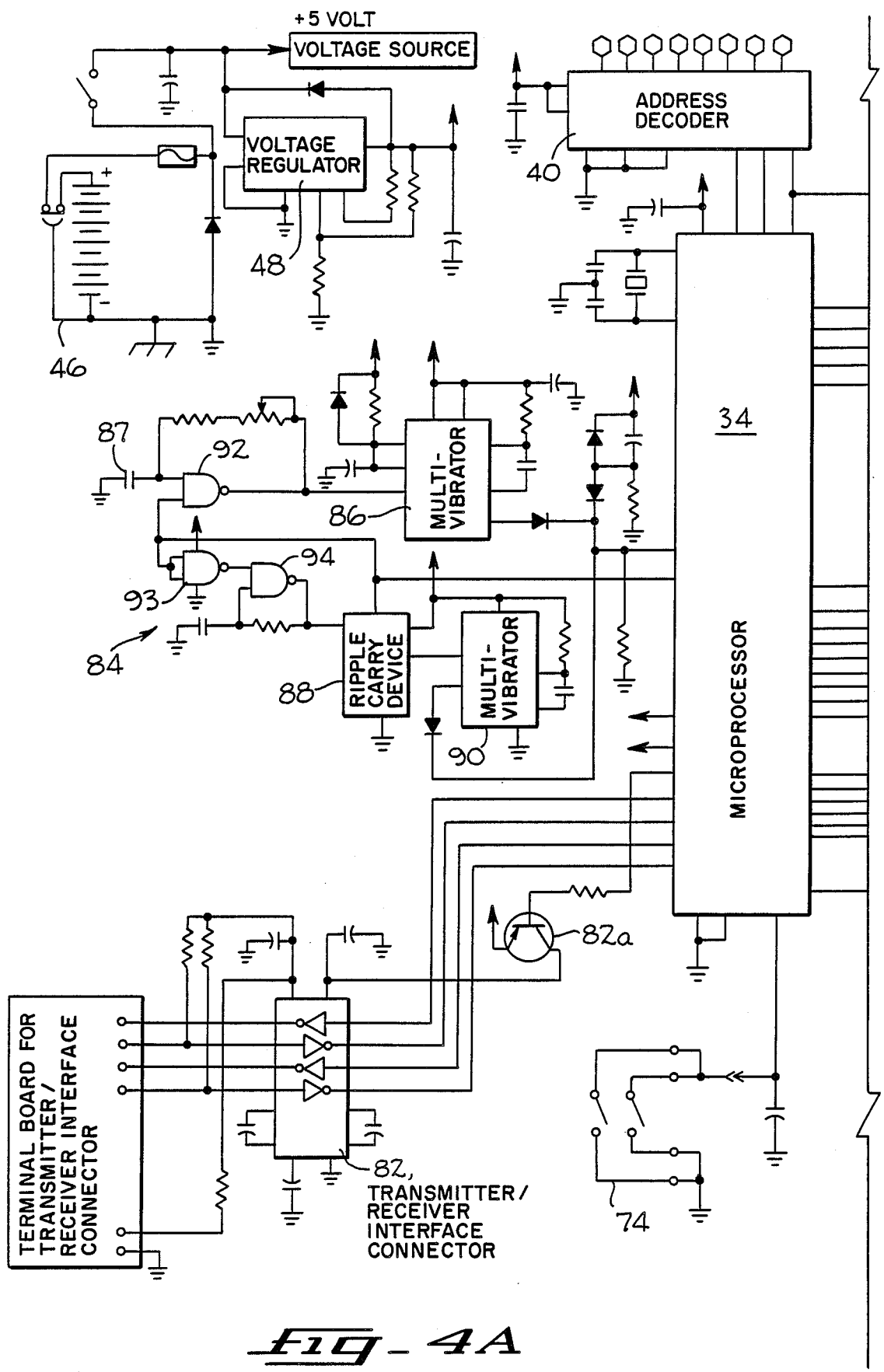

The apparatus 10 (FIG. 1) of the present invention measures and records the free fall drop of a container 11 in transit. In the exemplarY embodiment, the apparatus 10 comprises a conventional and well-known temperature transducer 12 for detecting the ambient temperature within the container 11 at the time the container completes its drop at the point of impact. The temperature transducer 12 may be a thermister or a temperature sensor of the type manufactured and sold by National Semiconductor Corporation of Santa Clara, Calif. as an LM335AZ temperature transducer. Also contained within the container 11 is a conventional and well-known absolute pressure transducer 13 for detecting the absolute barometric pressure within the container 11 at the time the container 11 completes its drop at the point of impact. The absolute pressure transducer 13 may be a silicon diaphragm-type pressure transducer of the type manufactured and sold by Mirco Switch Corp. of Freeport, Ill. as a 36PC15A1 pressure transducer.

Disposed within the container 11 is a suitable differential barometric pressure transducer 14 that detects the changing atmospheric pressures between the release elevation and the impact elevation. Stated otherwise, the differential pressure transducer 14 detects the change in atmospheric pressure from the time the container 11 begins its fall until the container 11 completes its drop at the point of impact. The differential pressure detector 14 may be a silicon diaphragm-type pressure transducer of the type 176PC14HD2 manufactured and sold by Micro Switch Corp. of Freeport, Ill.

One inlet 15 (FIG. 2) of the differential pressure transducer 14 is open to the atmosphere and the other inlet 16 of the differential pressure transducer 14 is disposed in an opening 16a, which opening 16a is covered by a porous membrane 17. The open inlet 15 of the differential pressure transducer 14 senses the pressure change during the free fall drop of the container 11. The porous membrane is disposed 17 at an end of the opening 16a opposite from the end of the opening 16a which the other inlet 16 is located and prevents over-ranging the differential pressure transducer 14 from large pressure changes resulting from extraneous conditions, such as movement by an airplane or movement between locations of different elevations. The prevention of over-ranging is attained by enabling gradual pressure changes to be equalized at the port of the inlet 16 of the differential pressure transducer 14.

More particularly, the port of the inlet 15 is received by an opening through a housing section 18 (FIG. 2). The port of the inlet 16 is received by a seal ring 19 and enters the opening 16a extending through a block 18a. At the opposite face of the block 18a is a ring seal 19a that seats within a recess surrounding the opening 16a extending through the block 18a. Membrane discs 17a–17c are made, in the preferred embodiment, of 0.02 micron GORE-TEX teflon material and are disposed between the ring seal 19a and the membrane 17 in axial alignment therewith. In the exemplary embodiment, the membrane 17 has a disc configuration and is made of 0.02 micron GORE-TEX teflon material, such as 0.02 micron GORE-TEX teflon material manufactured and sold by W. L. Gore and Associates of Elkton, Md. The membrane discs 17a–17c are also manufactured and sold by W.L. Gore and Associates of Elkton, Md. A locking plate 18b is secured to the block 18a by suitable means, such as screws, not shown, to hold the membrane 17, the discs 17a–17c and the sealing ring 19a in a secured fit therebetween. The inlet 16 communicates with atmosphere through a central opening through the locking plate 18b, the opening 16a through the block 18a and the membrane 17. The channel housing section 18 is secured to the block 18a by suitable means, such as screws, not shown, to retain the differential transducer 14 and the ring seal 19 therebetween.

The signals from the temperature transducer 12, absolute pressure transducer 13, and the differential pressure transducer 14 are ultimately processed by the circuitry of the apparatus 10 to calculate drop height and associated data of a free falling container.

The drop height of a free falling container is calculated through the following formula:

Drop height is equal to $$\frac{RT\,Pc}{g\,Pa}$$

wherein:

R is the gas constant for air;

T is the ambient or absolute temperature at the point of release;

Pc is the pressure change resulting from the drop from the time of commencement of the drop until the time of impact;

g is the gravitational constant; and

Pa is the absolute or atmospheric barometric pressure at the point of release.

R and g may be assumed to be constants. Therefore, the drop height of a free falling container may be calculated by detecting the ambient temperature at the point of release, the atmospheric pressure at the point of release, and the pressure change from the time the container 11 begins its drop until the container 11 completes its fall at the point of impact.

In the calculation of the drop height, reference is made to the ambient or absolute temperature at the point of release and the absolute or atmospheric barometric pressure at the point of release. In the operation of the apparatus 10, the ambient or absolute temperature is detected at the point of impact and the absolute or atmospheric barometric pressure is detected at the point of impact. The ambient or absolute temperature is, in substance, the same at the point of impact as it is at the point of release. The absolute pressure transducer 13, which detects the absolute or atmospheric barometric pressure, is not sufficiently sensitive to vary, in substance, the reading thereof between the point of release and the point of impact. On the other hand, the differential barometric pressure transducer 14 is sufficiently sensitive to detect the pressure differential between the point of release and the point of impact.

The container 11 is formed so that baffling from the walls of the container 11 and the various printed circuit boards within the container 11 shield the absolute pressure transducer 13 and the differential pressure transducer 14 from extraneous pressure variations due to wind, vehicle movement and the like.

The differential pressure transducer 14 (FIGS. 3 and 4C), in the exemplary embodiment, is a resistive bridge in which piezo-resistance elements along with fixed resistors comprise the four member bridge. When pressure is applied to the piezo-resistance elements, via a silicon diaphragm, a corresponding voltage signal is detected between opposite corners of the bridge. The differential pressure signals are applied to a well-known analog amplifier circuit 26, such as the TSC9000ACPA operational amplifier, manufactured and sold by Teledyne Semiconductor Corp. of Mountain View, Calif. The analog amplifier 26 amplifies and conditions the signals representative of the differential pressures. The conditioning of the differential pressure signals is accomplished by placing a capacitor 27 (FIG. 4C) in parallel with a feedback resistance 29 used in the analog amplifier circuit 26. The capacitor 27 enables spurious signals from the differential pressure transducer 14 to be cancelled out. A conventional buffer circuit 22 using a unity gain amplifier, such as the type used for the amplifier circuit 26 but with shorted feedback resistance, provides a buffer between the differential pressure transducer 14 and the amplifier circuit 26.

The amplified and conditioned differential pressure transducer signals at the output of amplifier circuit 26 are again buffered via a well-known unit gain buffer circuit 28, such as the buffer circuit OP220EZ manufactured and sold by PMI, Corp. of Santa Clara, Calif. The buffered signals representative of the differential pressures are applied to a well-known final amplifier circuit 30 (FIGS. 3 and 4B), such as the amplifier circuit OP220EZ manufactured and sold by PMI, Corp., which further conditions the differential pressure transducer signals and provides controllable amplification, by varying resistors 31 and 33, to achieve the desired signal amplitude range. A Zener diode 24 (FIG. 4C), which generates a reference voltage, provides voltage regulation for various circuits in the apparatus 10. A buffer 24a buffers the reference voltage from the Zener diode 24 so that it can be used as a reference voltage for accelerometers 66–68 to be described hereinafter.

The output of final amplifier circuit 30 is applied to a conventional analog-to-digital converter 32 (FIGS. 3 and 4B), such as the analog-to-digital converter ADC0831BCN manufactured and sold by National Semiconductor Corp. of Santa Clara, Calif. A reference voltage is applied to the analog-to-digital converter 32 through a transistor 32a. The digital data stream from the analog-to-digital converter 32, representing the magnitude of the changing diffrential pressure detected by the differential pressure transducer 14, is applied to the appropriate port of a well-known microprocessor 34 (FIGS. 3 and 4A). The microprocessor 34 is of the type manufactured and sold by Intel Corp. of Santa Clara, Calif., as the 80C31 microprocessor. The microprocessor 34, under the control of the software program (FIG. 5) stored in a conventional Read Only Memory (ROM) 36 (FIGS. 3 and 4B), addresses a conventional Random Access Memory (RAM) 42, one of four RAMs 42–45 and stores the latest signal representing the magnitude of the changing difeerential pressure detected by the differential pressure transducer 14 in the RAM 42 for later processing. The ROM 36 is of the type manufactured and sold by Jameco Corp. of Belmont, Calif., as the 27C64-15 read only memory. The RAMs 42–45 are of the type manufactured and sold by NEC Electronics Corp. of Mountain View, Calif., as the PD4464-15 random access memories.

In the exemplary embodiment, the sampling and storing of the differential pressure data is at a rate of approximately 100 data points per second, and storage of the data is such that when the latest differential pressure data is stored in the RAM 42, the earlier differential pressure data is shifted by one address. When all the addresses allocated for the differential pressure data are full, each shift results in the loss of the earliest differential pressure data. A conventional octal latch 38, interfacing with the microprocessor 34, ROM 36, RAMs 42–45, and a conventional programmable peripheral interface 64, is a bus interface latch employed with the microprocessor 34 to more fully separate address and data signals, and is of the type manufactured and sold by National Semiconductor Corp. of Santa Clara, Calif., as the 74HC573 octal latch. A conventional address decoder 40 is connected to the appropriate ports on the microprocessor 34 and functions to select or enable various components interfaced with the microprocessor 34, whereby the microprocessor 34 writes or reads data on the appropriate components selected by the software program stored in the ROM 36. The address decoder is of the type manufactured and sold by National Semiconductor Corp. of Santa Clara, Calif., as a 74HC38 address decoder.

Power for all the circuits in the apparatus 10 is supplied by a battery pack 46 (FIGS. 3 and 4A). A conventional voltage regulator 48 regulates the voltage at 5 volt direct current, in the exemplary embodiment, for all components except those associated with the absolute pressure transducer 13 and temperature transducer 12, as will be discussed hereinafter. A conventional voltage regulator 49 (FIGS. 3 and 4C) is similar to the voltage regulator 48 and serves as a backup for increased reliability. The voltage regulators 48 and 49 are of the type manufactured and sold by Intersil Corp. of Santa Clara, Calif., as the ICL7663 voltage regulators.

The temperature transducer 12 (FIGS. 3 and 4C) provides a voltage signal representative of the ambient temperature. The ambient temperature signal is amplified and conditioned by a well-known amplifier circuit 50. The amplifier circuit 50 is of a type manufactured and sold by National Semiconductor Corp. as the LM324 amplifier, and includes a capacitor 51 in parallel with feedback resistor 53 to cancel out spurious signals generated by the temperature transducer 12. The output of amplifier circuit 50 is applied to a well-known multiplexing analog-to-digital converter 52 (FIGS. 3 and 4B) of the type manufactured and sold by National Semiconductor Corp. as the ADC0834BCN multiplexing analog-to-digital converter. Battery voltage is detected at the input to a well-known amplifier circuit 54 (FIGS. 3 and 4B) in which it is amplified, and then applied to the multiplexing analog-to-digital converter 52, as was the amplified temperature transducer signal.

The absolute pressure transducer 13 (FIGS. 3 and 4C) and the differential pressure transducer 14, in the exemplary embodiment, use piezo-resistance elements to produce a voltage between opposite corners of the resistive bridge corresponding to pressure applied to the piezo-resistive elements via a silicon diaphragm deflected by air pressure. The analog signal generated by the absolute pressure transducer 13 is buffered by a conventional buffer circuit 56, which is a unity gain operational amplifier of the type manufactured and sold by National Semiconductor Corp. LM324 operational amplifier. The absolute pressure signal is amplified and conditioned by a well-known amplifier circuit 58. The amplifier circuit 58 is of the type manufactured and sold by National Semiconductor Corp. as the LM324 operational amplifier, and includes a capacitor 59 in parallel with feedback resistor 61 to cancel out spurious signals generated by the absolute pressure transducer 13 and the buffer circuit 56. A pressure-set potentiometer 63 is used to provide a DC offset signal to the output of the amplifier circuit 58 so that the amplitude of the resulting absolute pressure signal will accurately correspond to the actual ambient air pressure. This resulting analog signal is applied to the multiplexing analog-to-digital converter 52 as was the battery voltage signal and the signal representing the ambient temperature.

Power to the analog-to-digital converter 52, and amplifier circuits 50, 54, 56 and 58 is supplied by a conventional voltage regulator 62 manufactured and sold by Intersil Corp., which is a ICL7663 voltage regulator. Power to the absolute pressure transducer 13 and the temperature transducer 12 is supplied by a conventional voltage regulator 60 (FIGS. 3 and 4C), a step-up voltage regulator of the type manufactured and sold by Maxim Corp. of Sunnyvale, Calif., as the MAX630CPA voltage regulator.

Figure 4B:
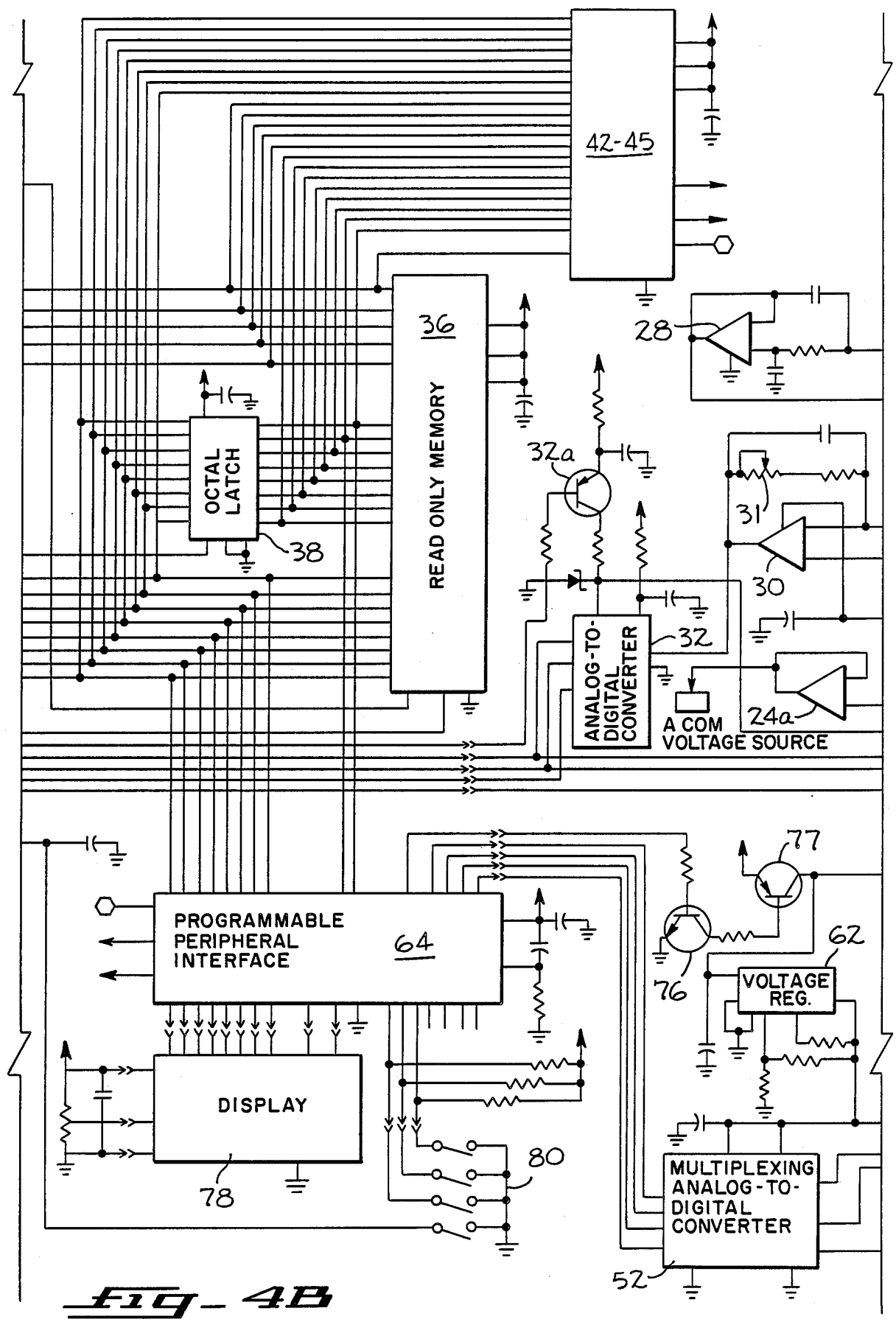

The output of the multiplexed analog-to-digital converter 52 is applied to the programmable peripheral interface (PPI) 64, such as 82C55A-5 PPI sold by Jameco Corp. (FIGS. 3 and 4B). The PPI 64, in the exemplary embodiment, is for extending the battery life by turning off circuitry not normally in use. When commanded by the microprocessor 34, the absolute pressure data, the temperature data, and the battery voltage data will be entered on the data bus by the PPI 64, routed to the RAM 43 for storage and used by the microprocessor 34, along with differential pressure data, for calculating drop height and associated data.

In the preferred embodiment, the apparatus 10 also measures and records acceleration. Toward this end, the suitable accelerometers 66–68 (FIG. 3) of the type manufactured and sold by ENDEVCO Corp. of San Juan Capistrano, Calif., are connected to conventional operational amplifier circuits 70–72, respectively, (FIGS. 3 and 4C), of the type manufactured and sold by PMI Corp. of Santa Clara, Calif., as the OP220EZ operational amplifier, for amplification and conditioning of the accelerometer signal produced respectively by the accelerometers 66–68.

The Zener diode 24 provides the reference voltage for amplifier circuits 70–72. The accelerometer signals are conditioned using capacitors 70a–72a in parallel with resistors 70b–72b, respectively, to cancel out spurious signals. The amplified and conditioned output signals from the accelerometers 66–68 are applied to a conventional multiplexing analog-to-digital converter 73 of the type manufactured and sold by National Semiconductor Corp. as the ADC0834BCN multiplexing analog-to-digital converter. The multiplexed accelerometer signals are applied to the same serial data port as was the digital differential pressure data. The microprocessor 34 alternately selects output signals from the analog-to-digital converters 32 and 73 for obtaining differential pressure data and acceleration data. The acceleration data is then stored in the RAM 42 as was the differential pressure data. As new acceleration data from accelerometers 60–62 is introduced into the RAM 42 earlier acceleration data is shifted by one address and the oldest acceleration data is lost.

Connected to the microprocessor 34 are suitable impact switches 74 (FIGS. 3 and 4A), such as 100100-10 switches manufactured and sold by Accudyne Corp. of Janesville, Wisc. The impact switches 74 are actuated and, in the exemplary embodiment, shorted to ground upon impact by the container 11. In the exemplary embodiment, the impact switches 74 are miniature inertial switches. Upon impact, the impact switches 74, in the exemplary embodiment, connect the appropriate port of the microprocessor 34 to ground. After a predetermined lapse of time, such as approximately one second, in the exemplary embodiment, the microprocessor 34 discontinues the flow of differential pressure data and accelerometer data into the RAM 42. The RAM 42 contains the entire range of pressures and accelerations experienced by the container 11 from the initial point of the drop to the point of impact. After a predetermined lapse of time after impact, power to the absolute pressure transducer 13, temperature transducer 12, analog-to-digital converter 52, and amplifier circuits 50, 54, 56 and 58 is switched on by the microprocessor 34 via the programmable peripheral interface 64 and transistors 76 and 77 (FIG. 4B). Since data from the sensors, including the battery sensor, is only required about the time of impact, in the preferred embodiment, the battery life is prolonged by applying power only when necessary.

Multiplexed data comprising battery voltage, temperature, and absolute pressure are then stored in the RAM 43. The microprocessor 34 uses the data stored in the RAMs 42 and 43 from the various sensors and calculates drop height of a free falling container using the following formula:

$$\text{Drop height} = \frac{RT\,Pc}{g\,Pa}$$

wherein:

R is the gas constant for air;
T is the ambient on absolute temperature at the time of release;
Pc is the pressure change from initial elevation at the time the container 11 begins its fall to the final elevation at the time the container 11 completes its fall at the point of impact;
g is the gravitational constant; and
Pa is the absolute or atmospheric barometric pressure at the release elevation.

R and g are assumed to be constant, therefore, drop height can be calculated by knowing T, Pc, and Pa.

The matter of calculating the ambient or absolute temperature and the absolute or atmospheric barometric pressure at the point of release and of detecting the ambient or absolute temperature and the absolute or atmospheric barometeric pressure at the point of impact has been heretofore discussed.

The RAMs 42 and 44 are used by the microprocessor 34 during computations for storing data temporarily. The RAM 43 stores data on temperature, absolute pressure, and battery voltage. The RAM 45 stores data on the drop height, once calculated, acceleration at impact, and date/time of the event. All data stored in the RAMs 43 and 45 may be suitably displayed in a conventional liquid crystal display 78 (FIGS. 3 and 4B) of the type manufactured and sold by Densitron of Torrance, Calif., as the LM22A2C16CB liquid digital display. The digital display 78 interfaces into the PPI 64. A key pad 80 (FIGS. 3 and 4B) is interfaced into the PPI 64 and is used to key up desired data onto the display 78 and to set up the desired functions of the apparatus 10 before it is placed in the package for transit. Transmitter/receiver interface 82 (FIGS. 3 and 4A) is used to interface an external device to the microprocessor 34 for external storage. The conventional transmitter/receiver interface 82 converts the data over the serial bus from the microprocessor 34 to industry standard data for connection to external devices, such as printers, computers and the like. The transmitter/receiver interface 82 is of the type manufactured by Maxim Corp. of Sunnyvale, Calif., as the MAX232CPE. A transistor 82a is used for supplying power to the transmitter/receiver interface connector 82.

A reset circuit 84 (FIGS. 3 and 4A) is employed to save power. The microprocessor 34, in the exemplary embodiment, is of a type which has a power-down feature. The microprocessoer 34 under normal operating conditions initiates by itself without any further action the cessation of clock pulses from its internal central processing unit when it has completed the collecting of data. A pulse into the microprocessor's "reset" port initiates reset clock pulses in the internal central processing unit of the microprocessor 34. The reset clock pulses initiated by the microprocessor 34 are of a slow enough frequency to enable all sensor data to be collected and all calculations to be made without noticeable detrimental impact on performance.

The reset circuit 84 uses a suitable multivibrator 86 (FIGS. 4A) of the type sold by Jameco Corp. as the CD4538B multivibrator, which is employed to supply the reset pulse into the microprocessor 34. A capacitor 87 determines the time period for the reset pulse. A ripple carry device 88 is used in conjunction with a suitable multivibrator 90, which is similar to multivibrator 86, as a power safety feature in case the multivibrator 86 does not provide a reset pulse within a prescribed period of time. This circuit uses the high or low signal, generated by the microprocessor 34, at a port next to the reset port to determine if the microprocessor 34 is in its power-down mode. If the port is "low" for a prescribed length of time and the reset pulse has not fired and the microprocessor 34 is in its full "up" mode, the "low" signal is sensed and, after a predetermined period of time, the multivibrator 90 injects a reset pulse into the reset port of the microprocessor 34. A high/low signal is also used to prevent the reset circuit 84 from injecting a reset pulse while the microprocessor 34 is already powered down by using NAND gates 92, 93 and 94 to determine whether a pulse should be fired.

The operation of the NAND gate 92 triggers the multivibrator 86 for producing oscillations, which in the exemplary embodiment are 100 Hz for applying the reset pulse to the microprocessor 34. The operation of the NAND gates 93 and 94 trigger the multivibrator 90 in the event of the malfunction of the reset pulse multivibrator 86.

Figure 5:
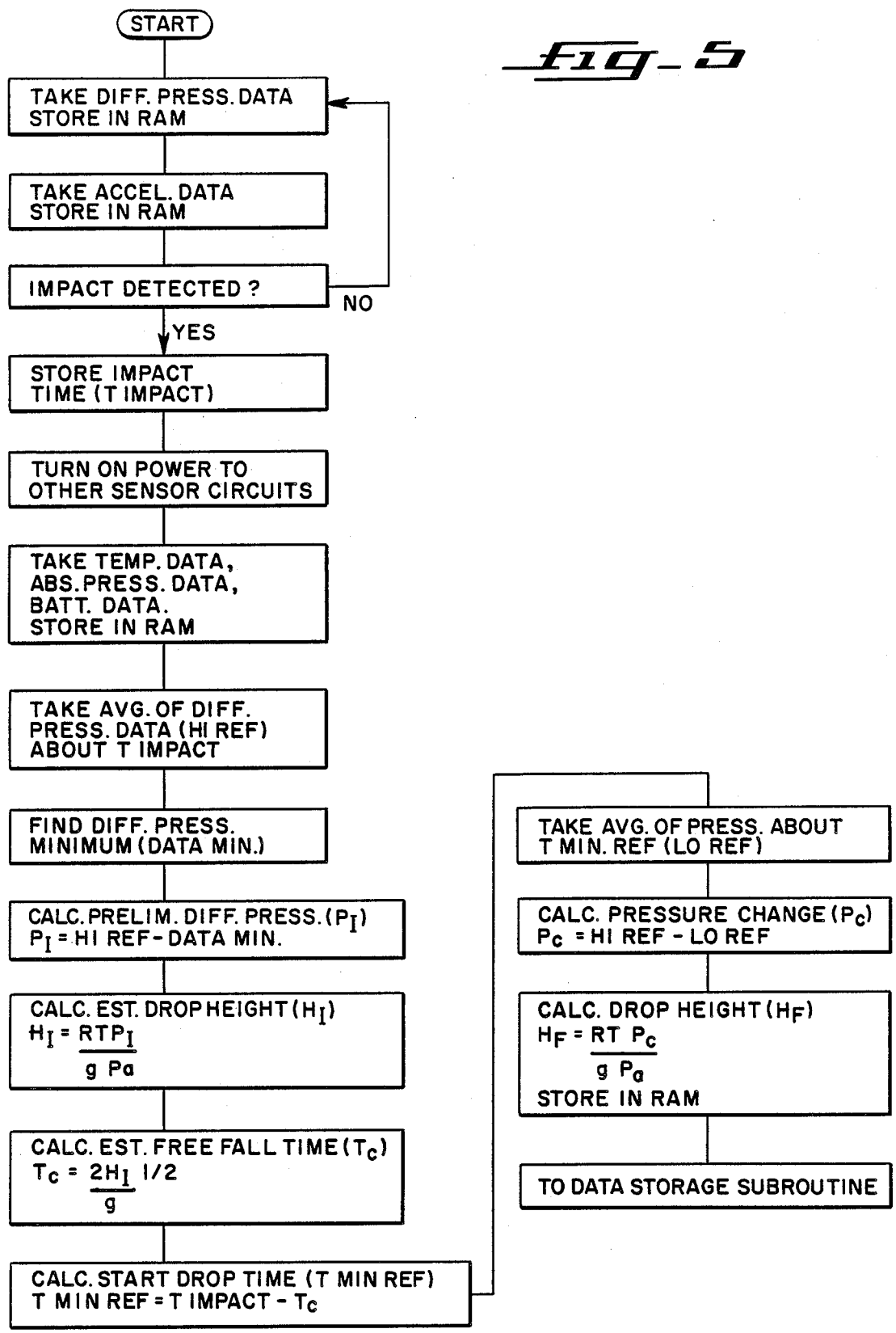
FIG. 5 is a flow chart of a software program used in conjunction with a microprocessor incorporated in the apparatus of the present invention for the measurement and recordation of drop height.

Illustrated in FIG. 5 is a flow chart of the program stored in the ROM 36 to control the operation of the microprocessor 34. While the container 11 is disposed at its initial location, where there has been no impact and, therefore, no drop, the program controls the microprocessor 34 to continuously sample digital differential pressure readings, derived from the differential pressure transducer 14, and store the data into RAM 42. Thus, new differential pressure data is continuously introduced into RAM 42 as old data is shifted out of RAM 42 and lost. Acceleration data from the accelerometers 66–68 are also applied to the RAM 42 along with the differential pressure data. The differential pressure data and the acceleration data stored in the RAM 42 are updated continuously until an impact is detected by the impact switches 74. Upon impact, impact time is stored in RAM 45. After an impact, differential pressure data and acceleration data are not applied to the RAM 42 until the apparatus 10 is reset for the succeeding test.

The microprocessor 34 turns on power to the remaining sensor circuits and data representing absolute pressure, temperature, and battery voltage are stored in the RAM 43. The microprocessor 34 is now ready to calculate drop height. The latest differential pressure readings (i.e., those occurring about the impact time) are averaged to obtain HiRef. The microprocessor 34 then searches the RAM 42 for the minimum differential pressure data to obtain Data(min). The preliminary pressure change between container 11 at the initial location and at the impact location is then calculated to be $P_I$ = HifRef − Data(min). Estimated drop height is calculated by the microprocessor 34 using the equation $$H_I = \frac{R T P}{g P a}.$$

Estimated free fall time is calculated by the microprocessor 34 using the equation $$T_c = \frac{(2H_I)^{\frac{1}{2}}}{g}.$$

The time immediately preceding the time the container 11 begins its fall is calculated to be Time(min ref) = T impact − Tc. The microprocessor 34 identifies the differential pressure data in the RAM 42 about Time(min ref) and averages this pressure data to obtain LoRef.

A refined change in pressure figure Pc is calculated using the equation Pc = HiRef - LoRef. A refined drop height $H_F$ is calculated using $$H_F = \frac{RT\,Pc}{g\,Pa}.$$

The value $H_F$, along with acceleration at time of impact, date/time of impact, battery voltage, temperature, and event number, is stored in the battery-backed RAMs 43 and 45 to be displayed on the digital display 78 or transmitted to an external recording device once the apparatus is retrieved from the container.

Illustrated in FIG. 6 is another embodiment of a differential transducer employed in the apparatus 10 of the present invention. A differential transducer 100 (FIG. 6) is similar in operation to the differential transducer 14 (FIG. 2). Components of the differential transducer 100 similar to the components of the differential transducer 14 have been designated with the same reference numeral but with a prime suffix added thereto.

Secured to the baffle block 18a and to a baffle block 101 at the lower surfaces thereof by suitable means, such as screws, is a bottom mounting plate 102. Secured to the baffle block 18a' and the baffle block 101 at the upper surfaces thereof by suitable means, such as screws, is a top stiffener plate 103. The bottom mounting plate 102 and the top stiffener plate 103 serve to reduce mechanical stresses on the transducer 100 from handling shock and vibrations. Such mechanical stresses have the tendency to add spurious signals to the output of the transducer.

For providing a baffle for the inlet 15', the inlet 15' seats within a bore 105 extending through the baffle block 101. A ring seal 106 also seated within the bore 105 surrounds the inlet 15. A ring seal 107 and a membrane 108 seat within the bore 105. The membrane 108, in the exemplary embodiment, has a disc configuration and is made of 0.02 micron GORE-TEX teflon material, such as the 0.02 micron GORE-TEX teflon material manufactured and sold by W. L. Gore and Associates of Elkton, Md. A locking plate 109 is secured to the block 101 by suitable means, such as screws, to hold the membrane 108 and the sealing ring 107 in a secured fit within the bore 105. The inlet 15' communicates with a central opening through the locking plate 109. The inlet 16' communicates with a central opening through the locking plate 18b'.

The opening 16a is filled with air between the inlet 16', and the membrane 17', The pressure of the air so contained in the opening 16'a remains relatively constant during the free fall of the container. The volume of air in the opening 16'a and the relatively slow flow rate of air through the inlet 16' produce a relatively constant reference pressure at the release point elevation for the differential pressure transducer 14. The leakage rate through the membrane D enables the transducer 100 to detect changes in air pressure as the height varies and yet the transducer 100 does not respond to rapid transients in air pressure caused by wrnd, package deformation on impact, or other extraneous conditions.

What is claimed is:

1. Apparatus for measuring the drop height of a container in which atmospheric pressure varies during the free fall of the container comprising:

(a) a differential pressure transducer disposed within said container for producing signals representative of the change in atmospheric pressure during the free fall of said container;

(b) an absolute pressure transducer disposed within said container for producing a signal representative of the absolute pressure within said container;

(c) an ambient temperature transducer disposed within said container for producing a signal representative of the ambient temperature within said container; and (d) means responsive to said signals produced by said differential pressure transducer, said absolute pressure transducer and said ambient temperature transducer for measuring the drop height of said container, (e) said differential pressure transducer comprising first means communicating with atmosphere during the free fall of the container and second means for establishing a reference pressure at the release point elevation.

2. Apparatus as claimed in claim 1 wherein said means measures the drop height of said container as follows:

$$\text{Drop height} = \frac{RT\,Pc}{g\,Pa}$$

wherein

R is the gas constant for the atmosphere within said container;

T is the ambient temperature within said container;

Pc is the change in atmospheric pressure resulting from the drop of said container;

g is the gravitational constant; and

Pa is the absolute pressure within said container.

3. Apparatus as claimed in claim 2 wherein said means is disposed within said container.

4. Apparatus as claimed in claim 3 wherein said means comprises impact switches disposed within said container and actuated by said container completing its fall at the point of impact, an-analog-to-digital converter circuit connected to said ambient temperature transducer and said absolute pressure transducer for converting said signal representing absolute pressure and a digital signal representing ambient temperature, said digital signal representing absolute pressure and said digital signal representing ambient temperature being applied to a microprocessor in response to the actuation of said impact switches.

5. Apparatus as claimed in claim 4 wherein said means comprises an analog-to-digital converter circuit connected to said differential pressure transducer for convering said signals representing changes in atmospheric pressure during the free fall of said container into digital signals representing changes in atmospheric pressure during the free fall of said container, and wherein said means comprises a data storage for receiving said digital signals representing changes in atmospheric pressure, said data storage device discontinues receiving said digital signals representing changes in atmospheric pressure in response to the actuation of said impact switches for supplying for said microprocessor digital signals representing changes in atmospheric pressure for the measuring of drop height of said container.

6. Apparatus as claimed in claim 4 wherein said data storage device discharges digital data signals representing changes in atmospheric pressure previously stored therein as more recent digital data signals representing changes in atmospheric pressure are stored therein.

7. Apparatus as claimed in claim 3 and comprising a digital display connected to said means for illustrating the drop height of said container measured by said means.

8. Apparatus as claimed in claim 3 wherein said means comprises a data storage device for storing data representing changes in atmospheric pressure during the free fall of said container.

9. Apparatus as claimed in claim 2 wherein said means comprises a reset circuit for switching between a normal operation mode and a lower power mode, thereby reducing overall power consumption.

10. Apparatus as claimed in claim 9 wherein said means comprises a microprocessor having a lower power mode and a normal operating mode, said reset circuit applying reset pulses to said microprocessor at a rate enabling normal operation for a period of time sufficient for measuring the drop height of said container.

11. Apparatus as claimed in claim 1 wherein said means is disposed within said container.

12. Apparatus as claimed in claim 11 wherein said means comprises switches disposed within said container and actuated by said container completing its fall at the point of impact, said absolute pressure transducer and said ambient temperature being activated in response to the actuation of said impact switches.

13. Apparatus as claimed in claim 12 wherein said means comprises an analog-to-digital converter circuit connected to said differential pressure transducer for converting said signals representing changes in atmospheric pressure during the free fall of said container, and wherein said means comprises a data storage device connected to said analog-to-digital converter circuit for receiving said digital signals representing changes in atmospheric pressure during the free fall of said container, said data storage device discontinues receiving said digital signals representing changes in atmospheric pressure in response to the actuation of said impact switches and supplies for said means digital signals representing changes in atmospheric pressure in response to the actuation of said impact switches.

14. Apparatus as claimed in claim 11 wherein said means comprises a data storage device for storing data representing changes in atmospheric pressure during the free fall of said container.

15. Apparatus as claimed in claim 11 wherein said means comprises impact switches disposed within said container and actuated by said container completing its fall at the point of impact, said signal representing said absolute pressure and said signal representing said ambient temperature being applied to said means in response to the actuation of said impact switches.

16. Apparatus as claimed in claim 11 and comprising a display within said container connected to said means for illustrating the drop height of said container measured by said means.

17. Apparatus as claimed in claim 1 wherein said first means includes one inlet open to atmosphere for sensing dynamic pressure changes during the free fall of said container, and said second means includes a membrane confronting another inlet to establish a reference atmospheric pressure established at the release point elevation.

18. Apparatus as claimed in claim 17 and comprising baffle means confronting said one inlet to reduce the effect of extraneous conditions.

19. Apparatus as claimed in claim 18 and comprising baffle means confronting said membrane to reduce the effect of extraneous conditions.

20. Apparatus as claimed in claim 19 and comprising stiffener means connected to said baffle means for reducing spurious signals from said differential pressure transducer.

21. Apparats as claimed in claim 1 wherein said means comprises a reset circuit for switching between a normal operation mode and a low-power mode, thereby reducing overall power consumption.

22. Apparatus as claimed in claim 21 wherein said means comprises a microprocessor having a low power mode and a normal operating mode, said reset circuit applying reset pulses to said microprocessor at a rate enabling normal operation for a period of time sufficient for measuring the drop height of said container.

23. A method of measuring the drop height of a container wherein atmospheric pressure varies during the free fall of the container comprising the steps of:
(a) detecting changes in atmospheric pressure during the free fall of said container by communicating with atmosphere during the free fall of the container for sensing dynamic pressure changes during the free fall of the container and comparing the dynamic pressure changes with a reference pressure at the release point elevation;
(b) detecting the absolute pressure within said container;
(c) detecting the ambient temperature in said container; and
(d) measuring the drop height of said container in response to the detection of changes in atmospheric pressure during the free fall of said container, in response to the detection of the absolute pressure within said container and in response to the detection of the ambient temperature in said container.

24. A method as claimed in claim 23 wherein the measurement of the drop height of the container is derived as follows:

$$\text{Drop height} = \frac{RT\,Pc}{g\,Pa}$$

wherein
R is the gas constant for the atmosphere within the said container;
T is the ambient temperature within aid container;
Pc is the change in atmospheric pressure resulting from the drop of said container;
g is the gravitational constant; and
Pa is the absolute pressure within said container.

25. Apparatus for measuring the free fall drop height of a container wherein the atmospheric pressure varies during the free fall of the container comprising:
(a) a differential pressure transducer disposed within said container for producing signals representative of the change in atmospheric pressure during the free fall of said container; and
(b) means responsive to said signals produced by said differential pressure transducer for measuring the free fall drop height of said container, said means comprises a data storage device for storing data representing changes in atmospheric pressure during the free fall of said container,
(c) said differential pressure transducer comprising first means communicating with atmosphere during the free fall of the container for sensing dynamic pressure changes during the free fall of the container and second means for establishing a reference pressure at the release point elevation.

* * * * *